(12) United States Patent
Sadakuni et al.

(10) Patent No.: US 12,434,729 B2
(45) Date of Patent: Oct. 7, 2025

(54) DRIVER ASSISTANCE SYSTEM FOR VEHICLE INCLUDING DISPLAY HAVING DIFFERENT IMPLEMENTATION OPTIONS

(71) Applicant: TOYOTA JIDOSHA KABUSHIKI KAISHA, Aichi-ken (JP)

(72) Inventors: Yudai Sadakuni, Toyota (JP); Masato Endo, Nagoya (JP); Yuko Hiratsuka, Toyota (JP); Akihito Nakamura, Toyota (JP); Shuhei Manabe, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 218 days.

(21) Appl. No.: 18/319,482

(22) Filed: May 18, 2023

(65) Prior Publication Data

US 2024/0025437 A1    Jan. 25, 2024

(30) Foreign Application Priority Data

Jul. 25, 2022    (JP) ................... 2022-117718

(51) Int. Cl.
*B60W 50/14*    (2020.01)
*B60K 35/00*    (2024.01)
(Continued)

(52) U.S. Cl.
CPC ............ *B60W 50/14* (2013.01); *B60K 35/00* (2013.01); *B60W 40/08* (2013.01); *B60K 35/10* (2024.01);
(Continued)

(58) Field of Classification Search
None
See application file for complete search history.

(56) References Cited

U.S. PATENT DOCUMENTS

2017/0313324 A1* 11/2017 Kumai ............... B60W 40/02
2018/0337870 A1* 11/2018 Schubert ............ H04L 51/02
(Continued)

FOREIGN PATENT DOCUMENTS

EP        4155856 A1 *  3/2023   ............ B60W 50/00
JP     2006163473 A  *  6/2006
JP    2020-158003 A    10/2020

OTHER PUBLICATIONS

Espacenet English Translation of JP-2006163473-A (Year: 2006).*

*Primary Examiner* — James J Lee
*Assistant Examiner* — Andrew Sang Kim
(74) *Attorney, Agent, or Firm* — HAUPTMAN HAM, LLP

(57) ABSTRACT

A personalization setting unit sets enable and disable of a personalization function that allows the set value to be changed to a recommended value for each of the driver assistance functions and for each driver registered in the driver information registration unit. A recommended value calculation unit obtains the recommended value based on driving-related information of the driver including a driving history. A change condition setting unit sorts a plurality of the recommended values into an approval type recommended value that requires an approval of the driver and an automatic change type recommended value that does not require the approval of the driver. A display control unit is able to display an approval screen for the approval type recommended value on a center display that is a display unit, and suspends display of the approval screen while the vehicle is traveling.

9 Claims, 14 Drawing Sheets

(51) Int. Cl.
  *B60K 35/10* (2024.01)
  *B60K 35/28* (2024.01)
  *B60K 35/29* (2024.01)
  *B60W 40/08* (2012.01)
  *B60W 50/00* (2006.01)

(52) U.S. Cl.
  CPC .............. *B60K 35/28* (2024.01); *B60K 35/29* (2024.01); *B60K 2360/119* (2024.01); *B60K 2360/161* (2024.01); *B60K 2360/191* (2024.01); *B60W 2050/0083* (2013.01); *B60W 2050/146* (2013.01); *B60W 2556/10* (2020.02)

(56) References Cited

U.S. PATENT DOCUMENTS

| | | | | |
|---|---|---|---|---|
| 2020/0269849 A1* | 8/2020 | Kang | .................... | G06V 20/597 |
| 2021/0362737 A1* | 11/2021 | Park | ..................... | G07C 5/0825 |
| 2022/0048517 A1* | 2/2022 | Khayyer | ................ | B60K 35/28 |

* cited by examiner

FIG. 1
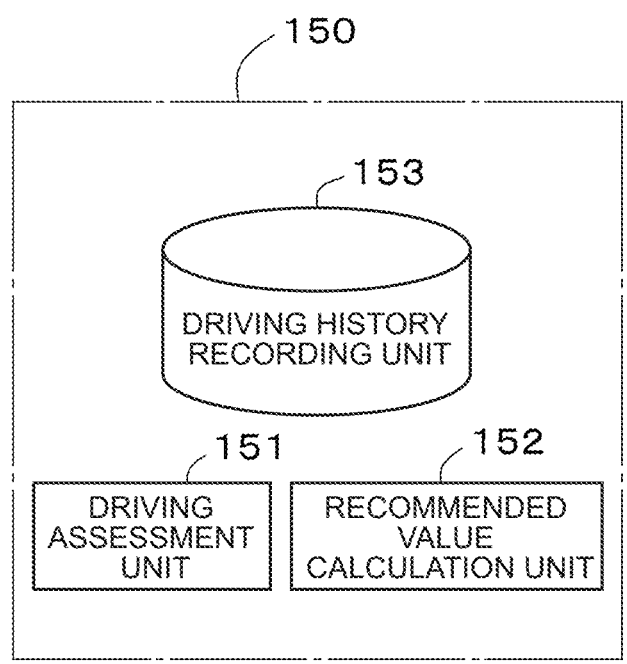
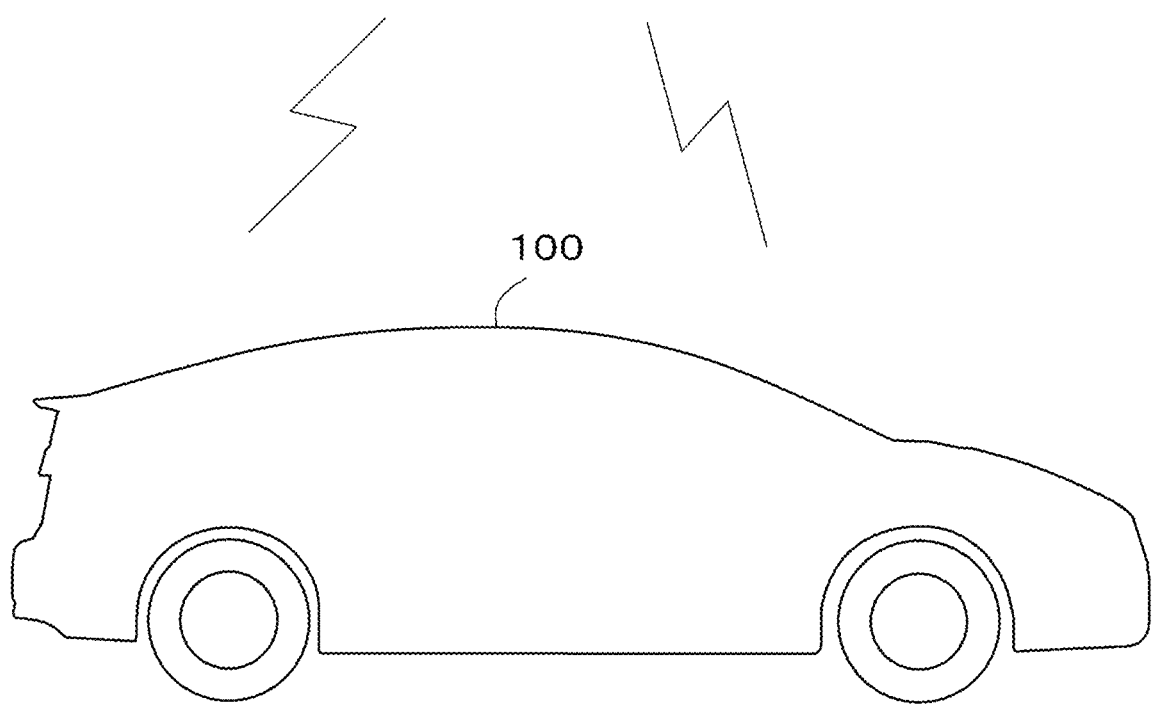

FIG. 8

| | FUNCTION ON-OFF | INTER-VEHICLE DISTANCE | | PERSONALIZATION ON-OFF | | | | | |
|---|---|---|---|---|---|---|---|---|---|
| | | CURRENT SET VALUE | MANUAL SET VALUE | ON | | | | | |
| ADAPTIVE CRUISE CONTROL | ON | MEDIUM | MEDIUM | | | | | | |
| | FUNCTION ON-OFF | NOTIFICATION | | BUZZER VOLUME | | DETECTION SENSITIVITY | | PERSONALIZATION ON-OFF | |
| | | CURRENT SET VALUE | MANUAL SET VALUE | CURRENT SET VALUE | MANUAL SET VALUE | CURRENT SET VALUE | MANUAL SET VALUE | ON | |
| PRE-CRASH SAFETY | ON | NOTIFICATION DISPLAY AND BUZZER | NOTIFICATION DISPLAY ONLY | MEDIUM | MEDIUM | HIGH | MEDIUM | | |
| | FUNCTION ON-OFF | NOTIFICATION | | BUZZER VOLUME | | OVERSPEED NOTIFICATION VEHICLE SPEED | | PERSONALIZATION ON-OFF | |
| | | CURRENT SET VALUE | MANUAL SET VALUE | CURRENT SET VALUE | MANUAL SET VALUE | CURRENT SET VALUE | MANUAL SET VALUE | ON | |
| ROAD SIGN ASSIST | ON | NOTIFICATION DISPLAY AND BUZZER | NOTIFICATION DISPLAY ONLY | MEDIUM | SMALL | 5km/h | 5km/h | | |
| | FUNCTION ON-OFF | NOTIFICATION | | BUZZER VOLUME | | WOBBLING DETECTION SENSITIVITY | | PERSONALIZATION ON-OFF | |
| | | CURRENT SET VALUE | MANUAL SET VALUE | CURRENT SET VALUE | MANUAL SET VALUE | CURRENT SET VALUE | MANUAL SET VALUE | ON | |
| LANE TRACING ASSIST | ON | NOTIFICATION DISPLAY AND BUZZER | NOTIFICATION DISPLAY ONLY | MEDIUM | MEDIUM | HIGH | MEDIUM | | |
| ... | ... | ... | | ... | | ... | | ... | |

FIG. 9

| DRIVER ID | ****** | | |
|---|---|---|---|
| DRIVER ASSISTANCE FUNCTION | NUMBER OF TIMES OF INFORMATION PROVISION | NUMBER OF INTERVENTION OPERATIONS | ACTIVATION HISTORY |
| LANE KEEPING ASSIST | * | * | YYYY/MM/DD HH:MM ** KILOMETER POST, ROUTE * OF METROPOLITAN EXPRESSWAY<br>YYYY/MM/DD HH:MM ** JUNCTION, * EXPRESSWAY<br>▽ |
| PRECEDING VEHICLE START ALARM | * | * | YYYY/MM/DD HH:MM ** INTERSECTION, ROUTE *<br>YYYY/MM/DD HH:MM ** ENTRANCE, PREFECTURAL ROUTE *<br>▽ |
| PRE-CRASH SAFETY | * | * | YYYY/MM/DD HH:MM IN FRONT OF ** GYMNASIUM, ROUTE *<br>YYYY/MM/DD HH:MM EAST OF ** HIGH SCHOOL, ROUTE *<br>▽ |
| FRONT CROSS TRAFFIC ALERT | * | * | YYYY/MM/DD HH:MM ** INTERSECTION, ROUTE *<br>YYYY/MM/DD HH:MM ** CROSSROAD, MUNICIPAL ROAD *<br>▽ |
| ... | ... | ... | ... |

FIG. 10

| DRIVER ID | ****** | | |
|---|---|---|---|
| NOTED ACTIONS | NUMBER OF TIMES | ACTIVATION HISTORY | |
| SUDDEN BRAKING | * | YYYY/MM/DD HH:MM ** KILOMETER POST, ROUTE * OF METROPOLITAN EXPRESSWAY | |
| | | YYYY/MM/DD HH:MM ** JUNCTION, ** EXPRESSWAY | |
| | | ▽ | |
| SUDDEN ACCELERATION | * | YYYY/MM/DD HH:MM ** INTERSECTION, ROUTE * | |
| | | YYYY/MM/DD HH:MM PARKING LOT OF ** DEPARTMENT STORE | |
| | | ▽ | |
| SHARP STEERING | * | YYYY/MM/DD HH:MM IN FRONT OF ** GYMNASIUM, ROUTE ** | |
| | | YYYY/MM/DD HH:MM EAST OF ** HIGH SCHOOL, ROUTE * | |
| | | ▽ | |
| LOOKING ASIDE | * | YYYY/MM/DD HH:MM IN FRONT OF ** STADIUM, ROUTE * | |
| | | YYYY/MM/DD HH:MM EAST OF ** HIGH SCHOOL, PREFECTURAL ROAD * | |
| | | ▽ | |
| ... | ... | ... | |

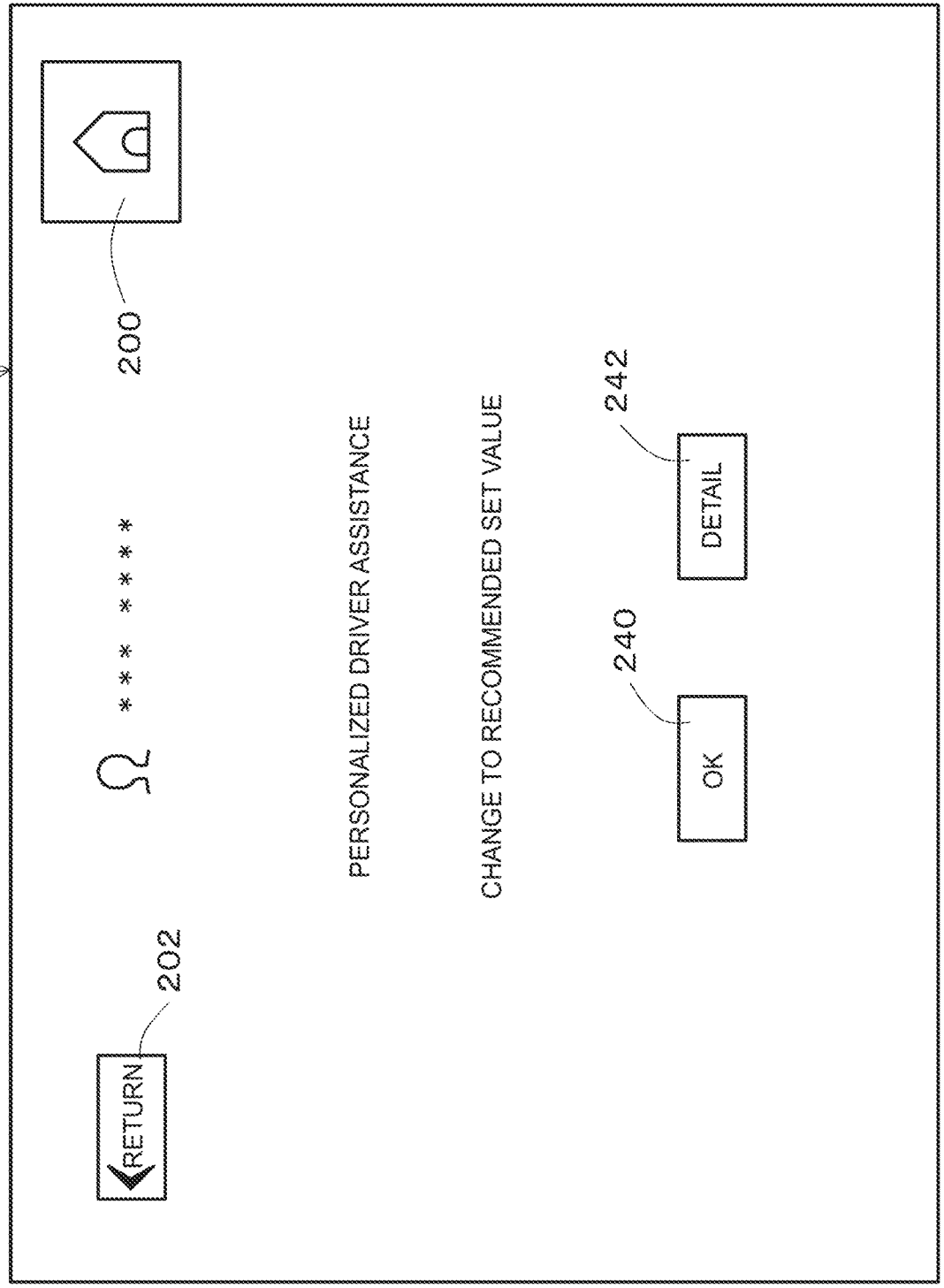

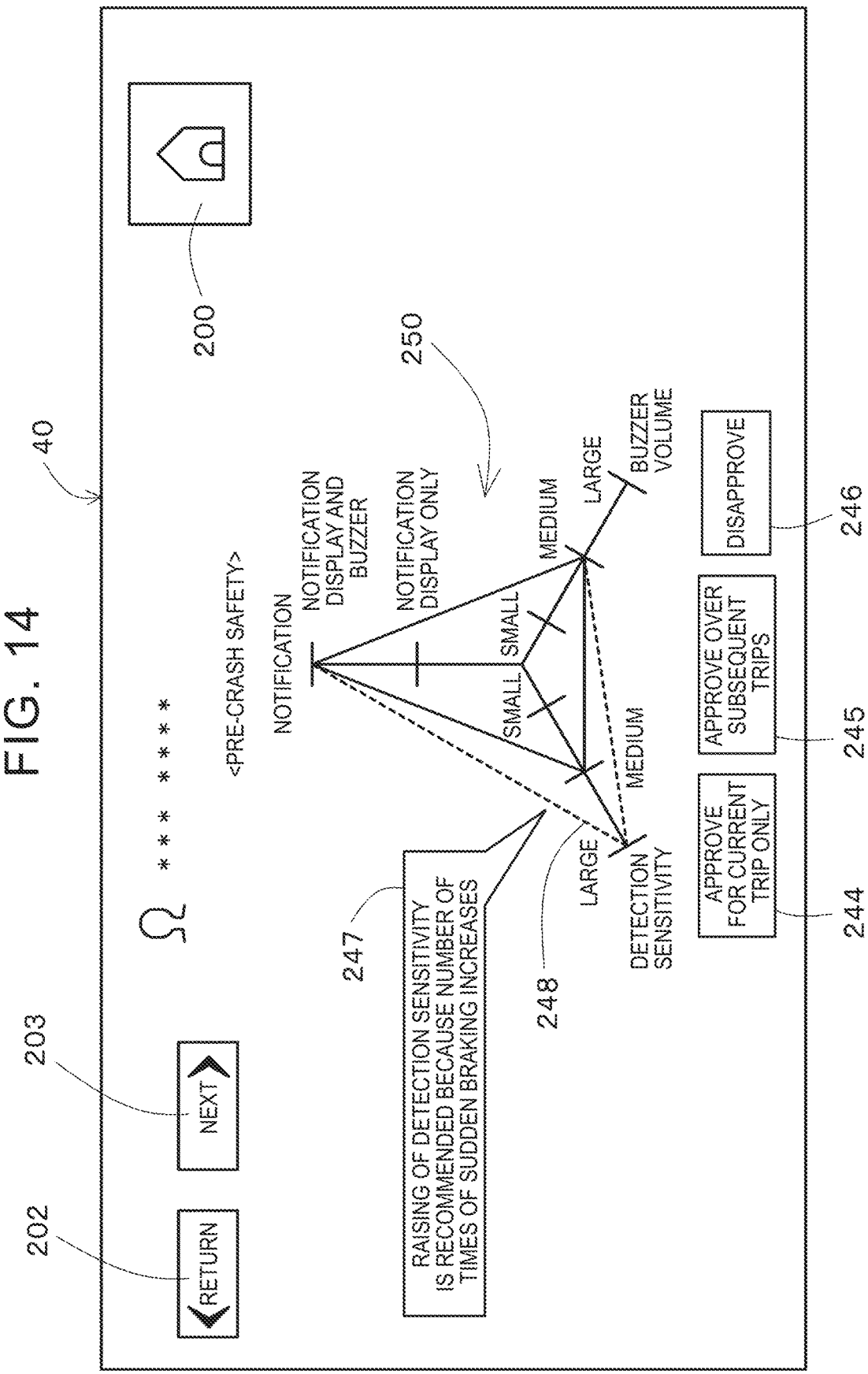

DRIVER ASSISTANCE SYSTEM FOR VEHICLE INCLUDING DISPLAY HAVING DIFFERENT IMPLEMENTATION OPTIONS

CROSS-REFERENCE TO RELATED APPLICATION

This application claims priority to Japanese Patent Application No. 2022-117718 filed on Jul. 25, 2022 incorporated herein by reference in its entirety.

BACKGROUND

1. Technical Field

The present specification discloses a vehicle driver assistance system.

2. Description of Related Art

For example, in Japanese Unexamined Patent Application Publication No. 2020-158003 (JP 2020-158003 A), when a change from an old vehicle to a new vehicle is made, set values of the old vehicle are handed over to the new vehicle. At the time of this handover, optimization adjustment (change of set values) is performed based on the physical difference between the old vehicle and the new vehicle.

SUMMARY

There are cases where an approval by a driver is required for changing the set values of the driver assistance function. The driver assistance system disclosed in the present specification is a driver assistance system capable of requesting an approval for changing settings at an appropriate timing while an environment in which the driver can concentrate on driving is maintained.

A driver assistance system for a vehicle disclosed in this specification can perform a plurality of driver assistance functions with respect to the vehicle. A plurality of setting items is provided for each of the driver assistance functions. Further, a set value is defined for each of the setting items. The driver assistance system includes a driver information registration unit, a personalization setting unit, a recommended value calculation unit, a change condition setting unit, and a display control unit. The driver information registration unit registers driver information. The personalization setting unit sets enable and disable of a personalization function that allows the set value to be changed to a recommended value for each of the driver assistance functions and for each driver registered in the driver information registration unit. The recommended value calculation unit obtains the recommended value based on driving-related information of the driver including a driving history. The change condition setting unit sorts a plurality of the recommended values into an approval type recommended value that requires an approval of the driver and an automatic change type recommended value that does not require the approval of the driver. The display control unit is able to display an approval screen for the approval type recommended value on a display unit, and suspends display of the approval screen while the vehicle is traveling.

According to the above configuration, the display of the approval screen in a manner that reduces concentration on driving is suppressed.

Also, in the above configuration, the change condition setting unit may sort the recommended value into the approval type recommended value when the setting item to which the recommended value is set is an intervention operation type. Further, the change condition setting unit may sort the recommended value into the automatic change type recommended value when the setting item to which the recommended value is set is an information provision type.

According to the above configuration, it is possible to save the time and effort for the approval operation by the driver by eliminating the need for approving the setting items of the information provision type.

Also, in the above configuration, the display control unit may cause the display unit to display, on the approval screen, a button image for displaying a detailed change content.

According to the above configuration, it is possible to display the detailed change content in accordance with the request by the driver.

Also, in the above configuration, the display control unit may highlight a portion changed by the approval type recommended value on a detailed explanation screen that displays the detailed change content.

According to the above configuration, the visibility of the approval target is improved.

Also, in the above configuration, the display control unit may cause the display unit to display the set value of the setting item in a form of a radar chart for each of the driver assistance functions on the detailed explanation screen.

According to the above configuration, various setting items of the driver assistance function can be grasped at a glance.

Also, in the above configuration, the display control unit may cause the display unit to display a text indicating a reason for changing the set value to the approval type recommended value on the detailed explanation screen.

According to the above configuration, the driver can approve the change of the set value with a sense of satisfaction.

The driver assistance system for the vehicle according to the present specification discloses the driver assistance system capable of requesting an approval for changing settings at an appropriate timing while an environment in which the driver can concentrate on driving is maintained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram exemplifying an overall configuration of a driver assistance system according to the present embodiment;

FIG. 8 is a diagram exemplifying a driver assistance function setting table;

FIG. 9 is a diagram exemplifying a driver assistance function recording table;

FIG. 10 is a diagram exemplifying a noted action table;

FIG. 13 is a diagram exemplifying an approval screen when the set values are changed to approval type recommended values; and FIG. 14 is a diagram exemplifying a detailed explanation screen when the set values are changed to approval type recommended values.

DETAILED DESCRIPTION OF EMBODIMENTS

System Overview

FIG. 1 exemplifies an overall configuration of a driver assistance system for a vehicle according to the present embodiment. This system includes a vehicle 100 and an over-the-air (OTA) center server 150.

Figure 7:
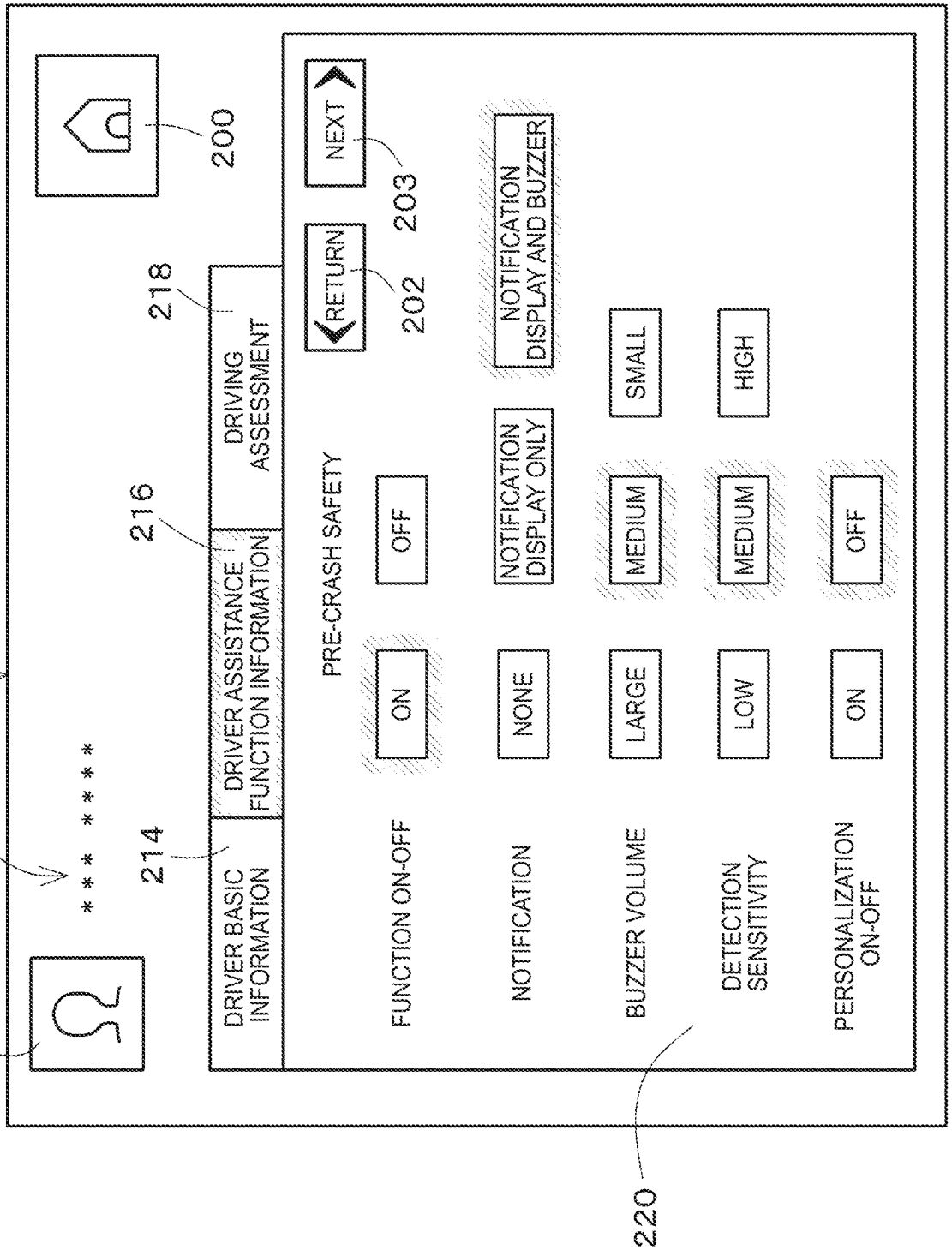
FIG. 7 is a diagram exemplifying a driver profile screen (driver assistance function setting screen)

The vehicle 100 is capable of executing multiple types of driver assistance functions. Further, as shown in FIG. 7 to be described later, each driver assistance function (for example, pre-crash safety) is provided with a plurality of setting items (for example, function ON-OFF). A set value (for example, ON-OFF) is defined for each setting item.

In addition, the vehicle 100 can set various settings of the driver assistance function for each driver. For this setting, driver information is registered in an ADAS-ECU 70 (see FIG. 6). When the driver information is registered, the setting of the driver assistance function is performed. For setting the driver assistance function, enable-disable setting (on-off setting) of a personalization function is performed as shown in FIG. 7 to be described later.

In order to provide personalization services, driving-related information including a driving history is transmitted from the vehicle 100 to the OTA center server 150 (see FIG. 1) for each driver. The driving-related information includes a driver assistance function recording table (see FIG. 9) and a noted action table (see FIG. 10) that will be described later.

The OTA center server 150 performs driving assessment based on the received driving-related information. Further, the OTA center server 150 calculates a recommended value with respect to the set value of the driver assistance function based on an assessment result. This recommended value is determined for each driver.

Figure 11:
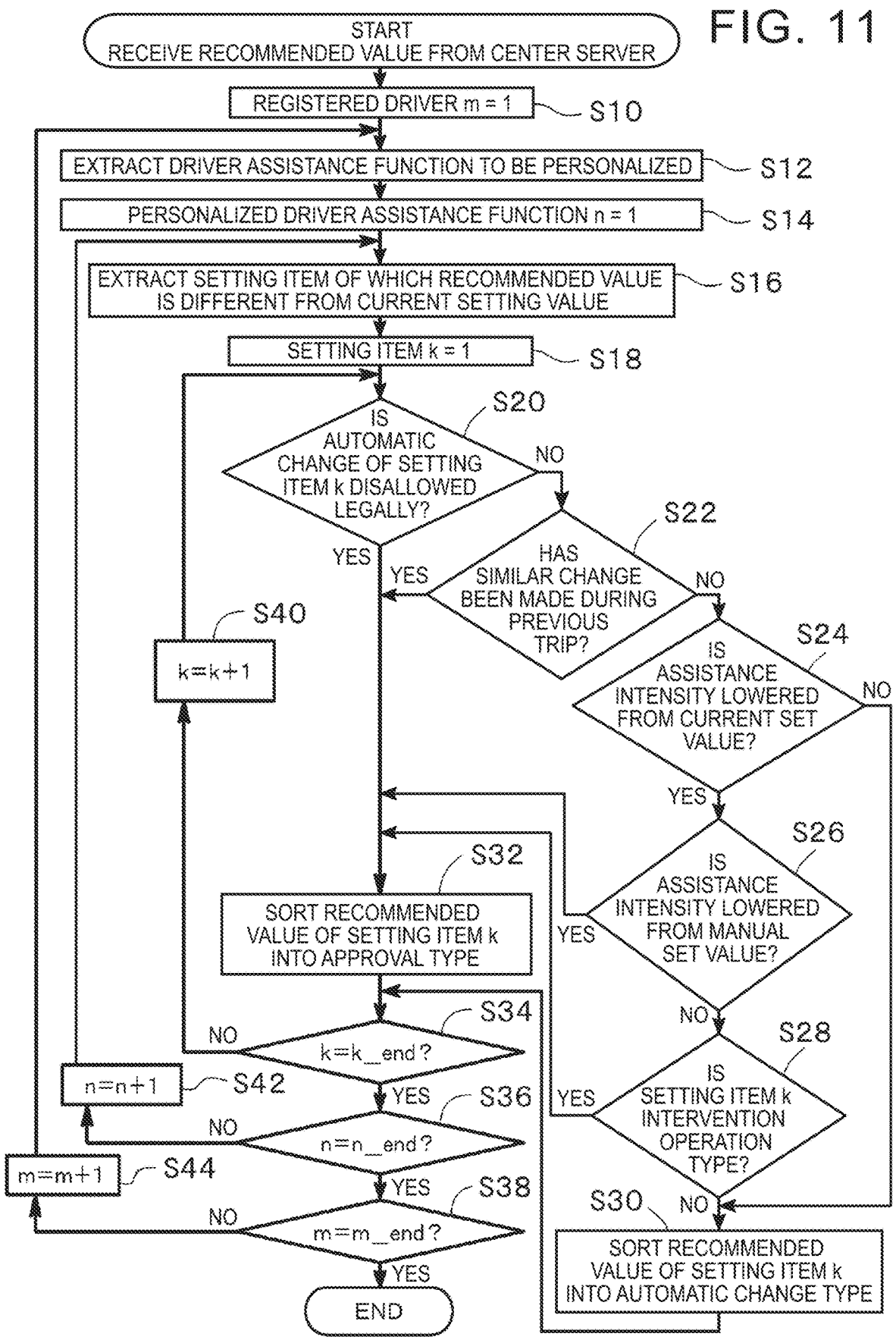
FIG. 11 is a diagram illustrating an approval necessity sorting flow.

The vehicle 100 that has received the recommended value sorts the recommended values into an automatic change type (S30) and an approval type (S32) based on an approval necessity determination flow (see FIG. 11). The recommended values sorted into the automatic change type are set as set values for the driver assistance function with the approval of the driver omitted. On the other hand, the recommended values sorted into the approval type are set as set values for the driver assistance function after the approval of the driver.

When the recommended value is approved, an approval screen as shown in FIGS. 13, 14 is displayed on a center display 40 that is a display unit. A display control unit 92 (see FIG. 6) suspends the display of the approval screen while the vehicle 100 is traveling. Such display control makes it possible to request an approval for setting changes at an appropriate timing while an environment in which the driver can concentrate on driving can be ensured.

Vehicle

Figure 2:
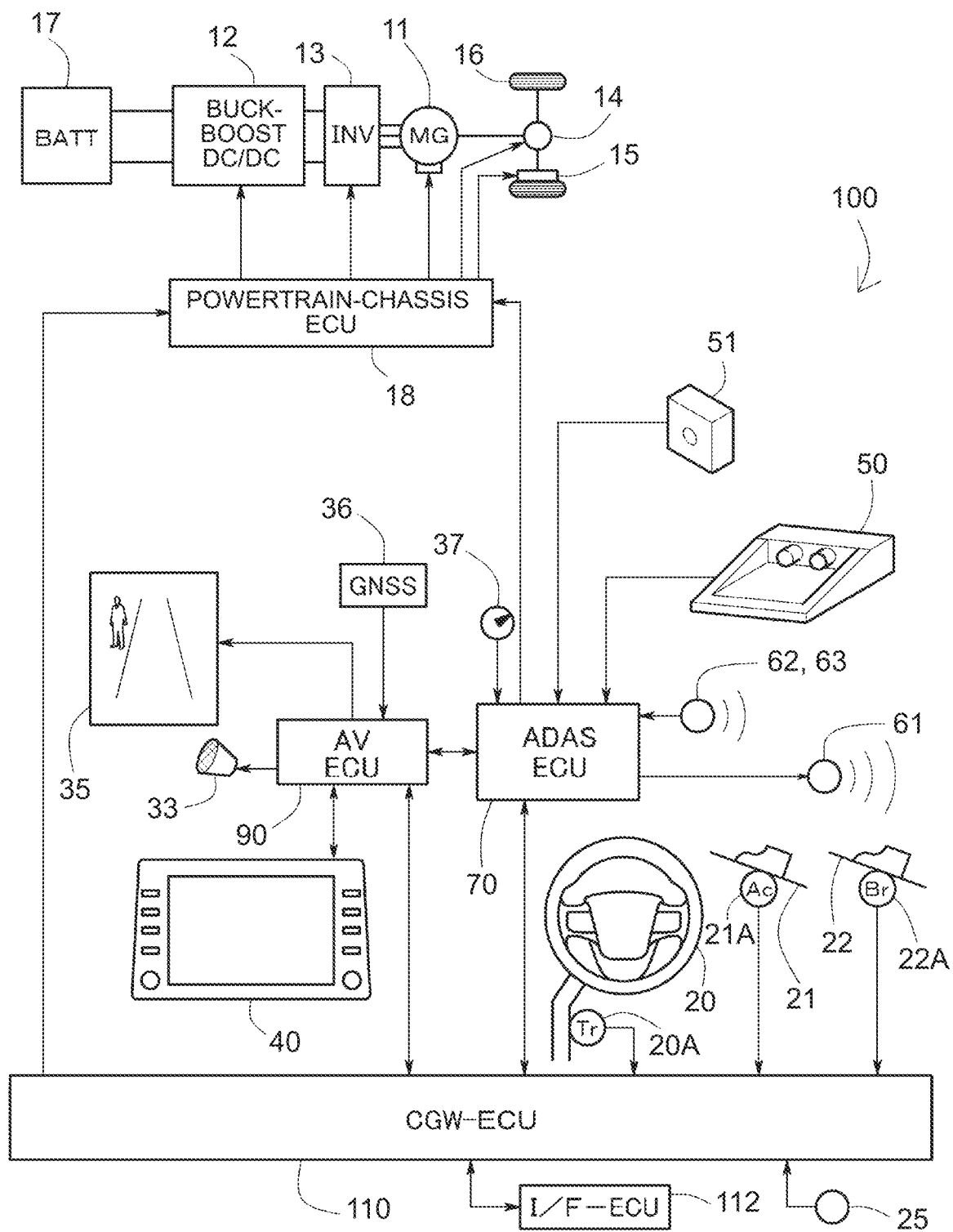
FIG. 2 is a diagram showing a hardware configuration of a vehicle.

FIG. 2 exemplifies a hardware configuration of the vehicle 100. Note that FIG. 2 mainly exemplifies devices related to the driver assistance function of the vehicle 100, and the illustration of devices that are less relevant to the above function is omitted as appropriate.

The vehicle 100 may be, for example, a battery electric vehicle (BEV) that includes a rotary electric machine 11 as a drive source. Further, the vehicle 100 may be a hybrid electric vehicle (HEV) or a plug-in hybrid electric vehicle (PHEV).

Drivetrain Devices

For example, the vehicle 100 includes a battery 17, a buck-boost DC/DC converter 12, an inverter 13, and the rotary electric machine 11 as drivetrain high-voltage circuits. The direct-current (DC) power output from the battery 17 is, for example, stepped up by the buck-boost DC/DC converter 12 and further converted into alternating current (AC) power by the inverter 13. The rotary electric machine 11 is driven by supplying the converted AC power to the rotary electric machine 11. The driving force is transmitted to wheels 16. Further, the wheels 16 are provided with a steering actuator 14 as a steering mechanism and a brake actuator 15 as a braking mechanism.

Further, the vehicle 100 is also provided with a steering wheel 20, an accelerator pedal 21, and a brake pedal 22 as mechanisms for manual operation. Further, the vehicle 100 is provided with a torque sensor 20A that detects an operation amount of the steering wheel 20. Still further, the vehicle 100 is provided with an accelerator position sensor 21A that detects the operation amount (depression amount) of the accelerator pedal 21 and a brake position sensor 22A that detects the operation amount (depression amount) of the brake pedal 22.

The operation amounts detected by the torque sensor 20A, the accelerator position sensor 21A, and the brake position sensor 22A are transmitted as electrical signals from the sensors 20A to 22A to a central gateway ECU 110 (hereinafter referred to as CGW-ECU as appropriate). In response to the above, the CGW-ECU 110 transmits a normal drive command, a normal braking command, and a normal steering command to a powertrain-chassis ECU 18.

Further, when an intervention operation type driver assistance function is executed, an intervention operation command is transmitted from the ADAS-ECU 70 to the powertrain-chassis ECU 18. For example, the intervention operation command has priority over the normal drive command, the normal braking command, and the normal steering command. The intervention operation command includes an intervention drive command, an intervention braking command, and an intervention steering command. Details of the driver assistance function will be described later.

The powertrain-chassis ECU 18 transmits a switching signal to the inverter 13 in accordance with the normal/intervention drive commands. The powertrain-chassis ECU 18 also transmits a drive signal to the motor of the brake actuator 15 in accordance with the normal/intervention braking commands. Further, the powertrain-chassis ECU 18 transmits drive signals to the steering actuator 14 in response to the normal/intervention steering commands.

Sensors

FIG. 2 exemplifies sensors for enabling the driver assistance functions for the vehicle 100 to be executed. The vehicle 100 includes an exterior camera unit 50, a LiDAR sensor 61, and radar sensors 62, 63 as sensors for grasping the situation outside the vehicle.

Figure 3:
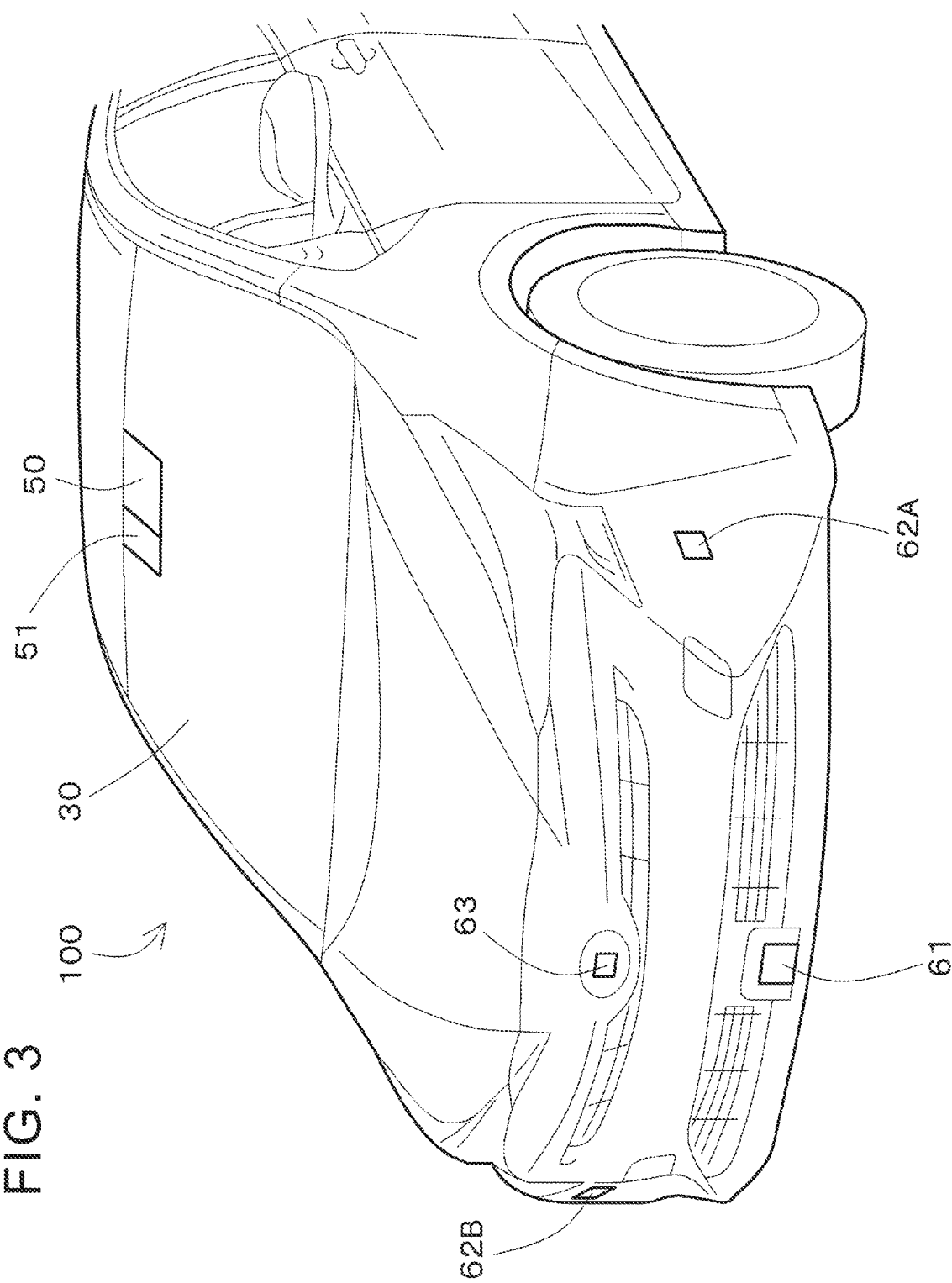
FIG. 3 is a diagram exemplifying various sensors mounted in a front portion of the vehicle.

FIG. 3 illustrates the front portion of the vehicle 100. A front center radar sensor 63 is provided on a front surface portion of the vehicle 100, for example, on the rear side of an emblem in the central portion in the vehicle width direction. Front side radar sensors 62A, 62B are provided on respective sides of the front surface of vehicle 100. Both of the radar sensors are composed of millimeter wave radars, for example.

Furthermore, the LiDAR sensor 61 is provided on the front surface of the vehicle 100, for example, in the central portion in the vehicle width direction, below the license plate mounting position. The LiDAR (Light Detection and Ranging) sensor 61 planarly scans with laser light (for example, infrared rays) to measure the distance to surrounding objects. The LiDAR sensor 61 is, for example, a solid-state unit. Three dimensional point cloud data in front of the vehicle 100 can be obtained by the LiDAR sensor 61 planarly scanning forward of the vehicle 100 with a laser beam.

Figure 4:
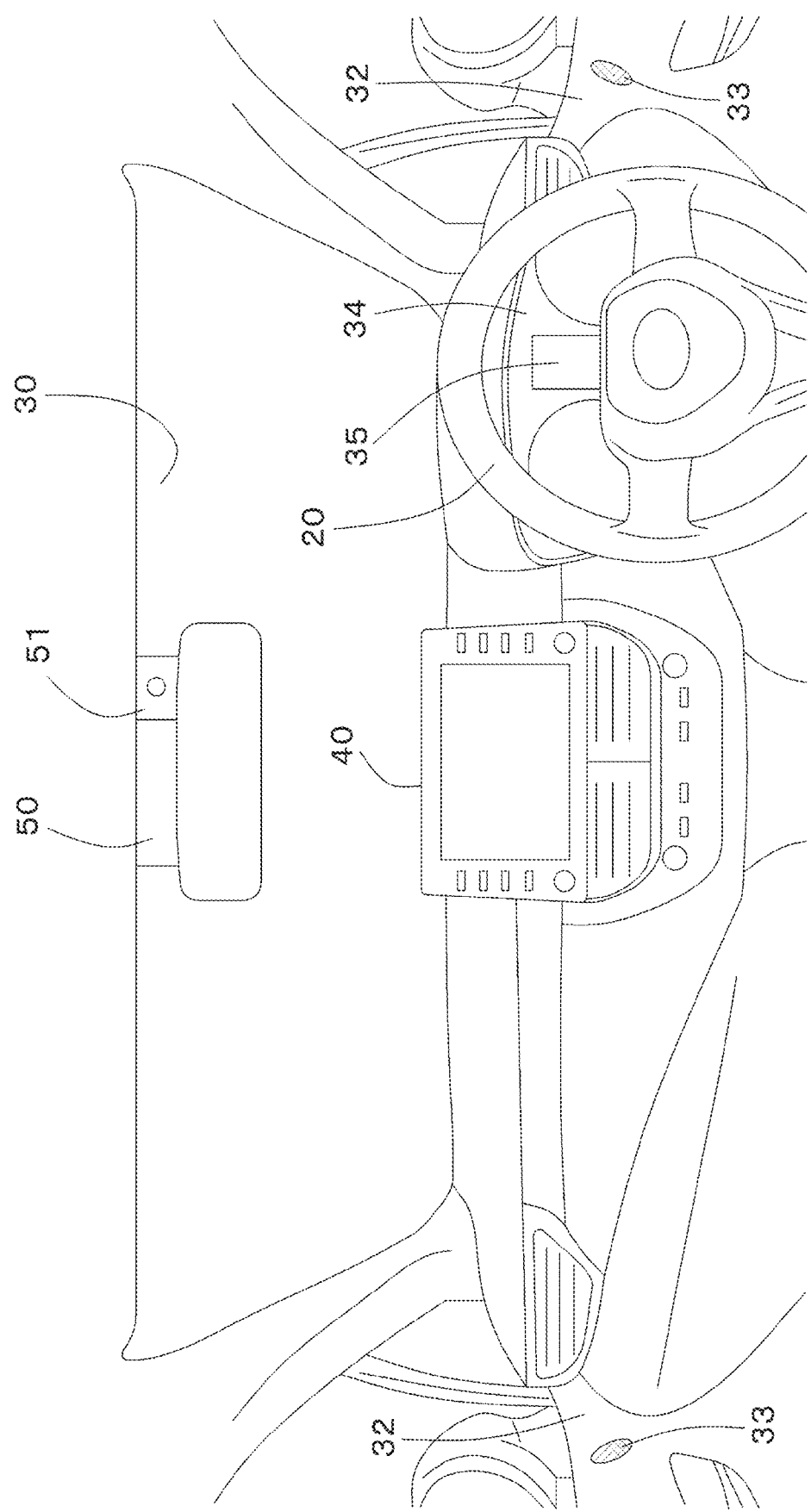
FIG. 4 is a diagram exemplifying a front portion of a vehicle cabin.

With reference to FIGS. 3 and 4, the exterior camera unit 50 and an interior camera 51 are provided on the rear surface of a windshield glass 30, that is, a surface exposed to a vehicle cabin. The exterior camera unit 50 and the interior camera 51 are provided, for example, in the center portion of the windshield glass 30 in the vehicle width direction and above the windshield glass 30.

The exterior camera unit 50 is, for example, a stereo camera unit (imaging unit) composed of two cameras, and is capable of imaging the outside of the vehicle, more specifically, imaging forward of the vehicle through the windshield glass 30. The interior camera 51 is, for example, a monocular imaging device, and includes the driver seat in a field of view of the imaging device. The interior camera 51 can capture the face of the driver who is seated in the driver's seat.

The exterior camera unit 50 and the interior camera 51 are each capable of capturing moving images. The captured moving image data is stored in a captured image storage unit 52 (see FIG. 6) in a state of being associated with the date and time when the image is captured.

With reference to FIG. 2, a self-position estimator 36 is, for example, a receiver of a global navigation positioning satellite system. The self-position estimator 36 is connected to an AV-ECU 90.

A clock 37 is connected to the ADAS-ECU 70. As will be described later, the driver assistance function determination unit 74 (see FIG. 6) of the ADAS-ECU 70 acquires the date and time when the driver assistance function is executed from the clock 37 and stores the date and time in a driving information storage unit 80. Further, a noted action determination unit 84 acquires the date and time at which the noted action of the driver occurs from the clock 37 and stores the date and time in the driving information storage unit 80.

Figure 12:
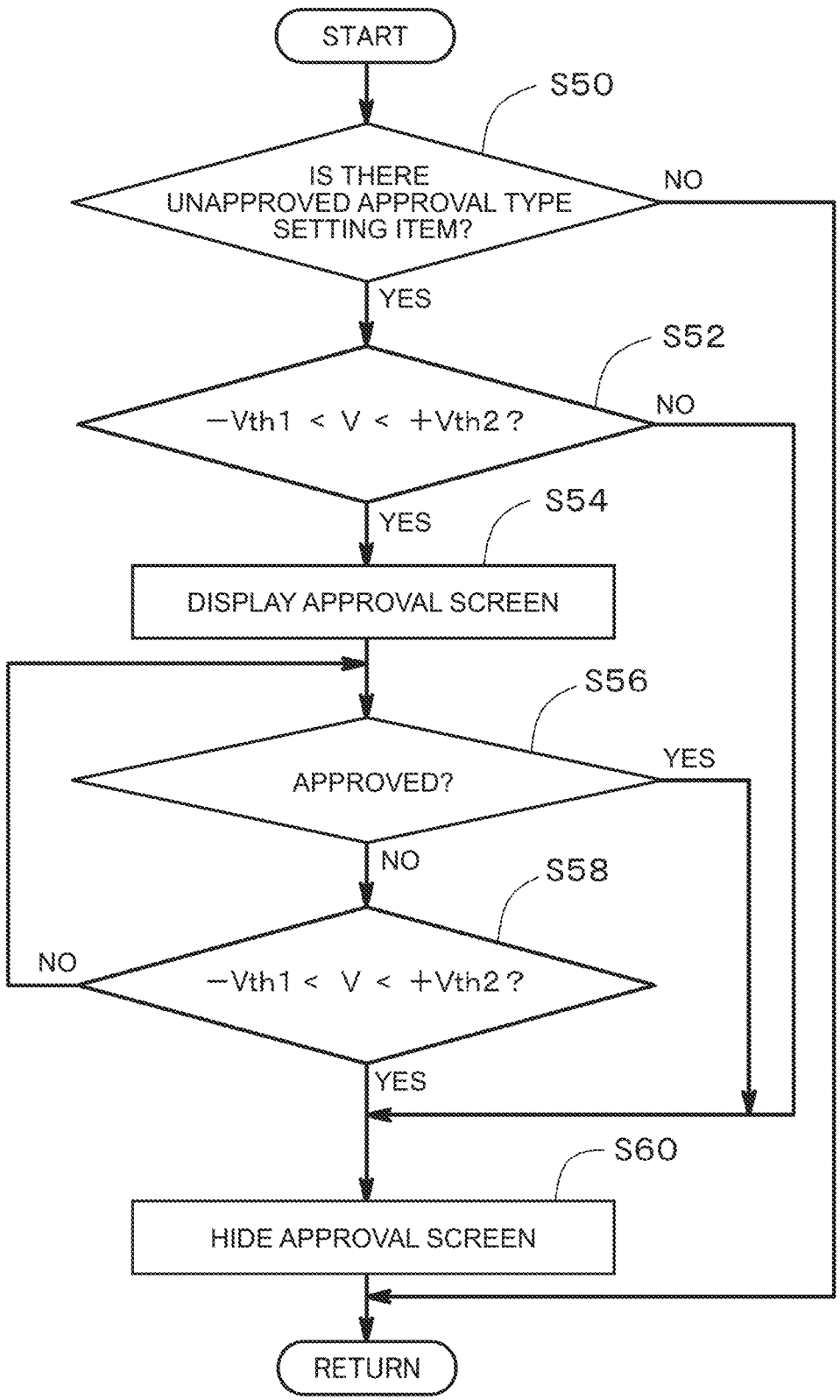
FIG. 12 is a diagram exemplifying a display necessity determination flow.

Further, the vehicle 100 is also provided with a vehicle speed sensor 25. As will be described later, the approval by the driver may be required when various set values of the driver assistance function are changed to recommended values. At this time, as illustrated in FIG. 12, the display timing of the approval screen is determined based on the vehicle speed. Specifically, when the display control unit 92 (see FIG. 6) determines that the vehicle 100 is not traveling (that is, the vehicle 100 is stopped) (S52), the display control unit 92 displays the approval screen on a center display 40 that is the display unit.

Audiovisual Devices

FIG. 4 illustrates the front portion of the vehicle cabin. As video devices, an instrument panel is provided with the center display 40 and a meter display 35.

The center display 40 is, for example, a touch panel display in which an input unit and a display unit are integrated. The center display 40 is installed, for example, at the center of the instrument panel in the vehicle width direction.

The center display 40 displays various types of information of the vehicle 100. For example, a navigation screen (not shown) showing a route to a destination is displayed on the center display 40. Furthermore, the center display 40 displays a driver profile screen exemplified in FIG. 7 and an approval screen related to personalization settings exemplified in FIGS. 13, 14.

With reference to FIG. 4, the meter display 35 is provided within an instrument cluster 34. The meter display 35 is disposed in front of the steering wheel 20, for example. For example, a notification message is displayed on the meter display 35 when an information provision type driver assistance function is executed.

Speakers 33 are provided in the vehicle cabin as an audio device. For example, the speakers 33 are provided above and in front of paired front doors 32, 32, respectively. Each speaker 33 is, for example, a so-called tweeter that outputs high-pitched sounds. Also, an output surface of each speaker 33 is directed toward the driver or a passenger seated in the passenger seat. As will be described later, a warning sound is output from the speakers 33 when the information provision type driver assistance function is executed.

ECU

As illustrated in FIG. 2, the vehicle 100 is provided with a plurality of electronic control units (ECUs). These electronic control units are provided for each function of the vehicle 100, for example. For example, the vehicle 100 includes the powertrain-chassis ECU 18, the ADAS-ECU 70, the AV-ECU 90 and an I/F-ECU 112.

Further, the vehicle 100 is provided with a central gateway ECU 110 (CGW-ECU) as a master ECU that governs these functional ECUs. The CGW-ECU 110 governs each functional ECU, for example, when cooperative control in which multiple functional ECUs cooperate to execute one function is executed.

The powertrain-chassis ECU 18, the ADAS-ECU 70, the AV-ECU 90, and the I/F-ECU 112 can communicate with each other via the CGW-ECU 110. Each ECU is connected by a signal line complying with the controller area network (CAN) standard, for example.

The powertrain-chassis ECU 18 controls the rotary electric machine 11, the steering actuator 14, and the brake actuator 15. Further, the I/F-ECU 112 is an ECU serving as an interface for receiving signals from an external device such as the OTA center server 150 (see FIG. 1).

The ADAS-ECU 70 is an ECU for ADAS that denotes the advanced driver-assistance system. The ADAS-ECU 70 is connected via signals to the exterior camera unit 50, the interior camera 51, the LiDAR sensor 61, and the radar sensors 62, 63 that are sensors for grasping conditions outside the vehicle.

The AV-ECU 90 executes display control and audio control of the speakers 33, the meter display 35, and the center display 40. The input operation information to the center display 40 that is a touch panel is transmitted from the AV-ECU 90 to the ADAS-ECU 70 and the CGW-ECU 110.

Figure 5:
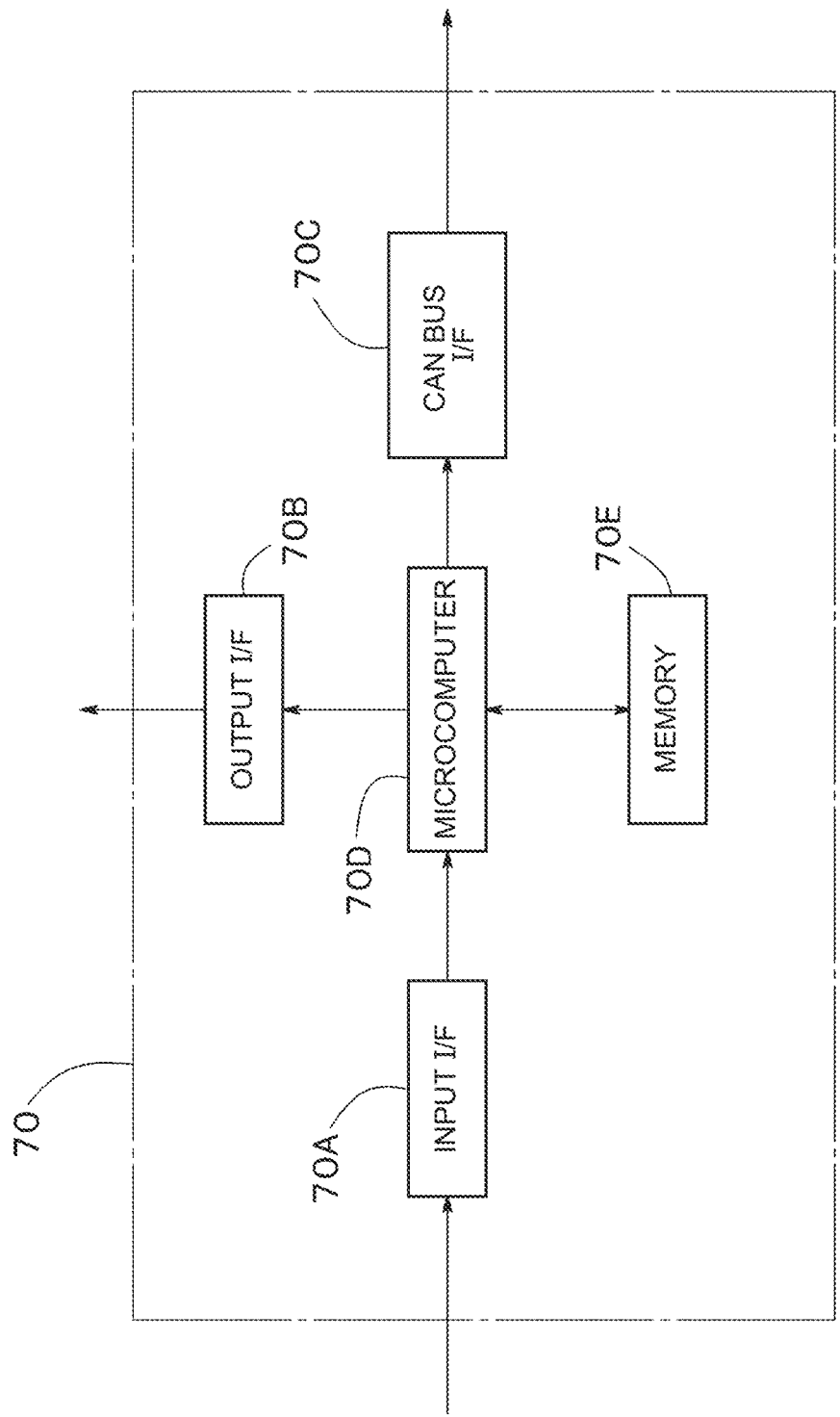
FIG. 5 is a diagram exemplifying hardware configurations of an OTA server, an ADAS-ECU, and an AV-ECU.

Both the functional ECUs and the CGW-ECU 110 described above are each composed of an electronic device (computer). FIG. 5 exemplifies the hardware configuration of the ADAS-ECU 70. The functional ECUs and the CGW-ECU 110 described above also have the same hardware configuration.

The ADAS-ECU 70 (other ECUs as well) includes an input OF 70A, an output OF 70B, a CAN bus OF 70C, a microcomputer 70D, and a memory 70E.

The CAN bus OF 70C is a device for connecting the ADAS-ECU 70 with other ECUs. The input OF 70A is a connection device for the ADAS-ECU 70 to receive a signal from an in-vehicle sensor device such as the exterior camera unit 50. The output OF is a connection device for transmitting signals from the ADAS-ECU 70 to devices other than the ECUs.

The microcomputer 70D (microcomputer) executes various controls and calculations in accordance with a given program. For example, the microcomputer 70D includes peripheral devices such as a CPU, a memory, and an input-output device. Furthermore, the memory 70E that is a storage device such as a solid state drive (SSD) is connected to the microcomputer 70D.

Functional Block of AV-ECU

Figure 6:
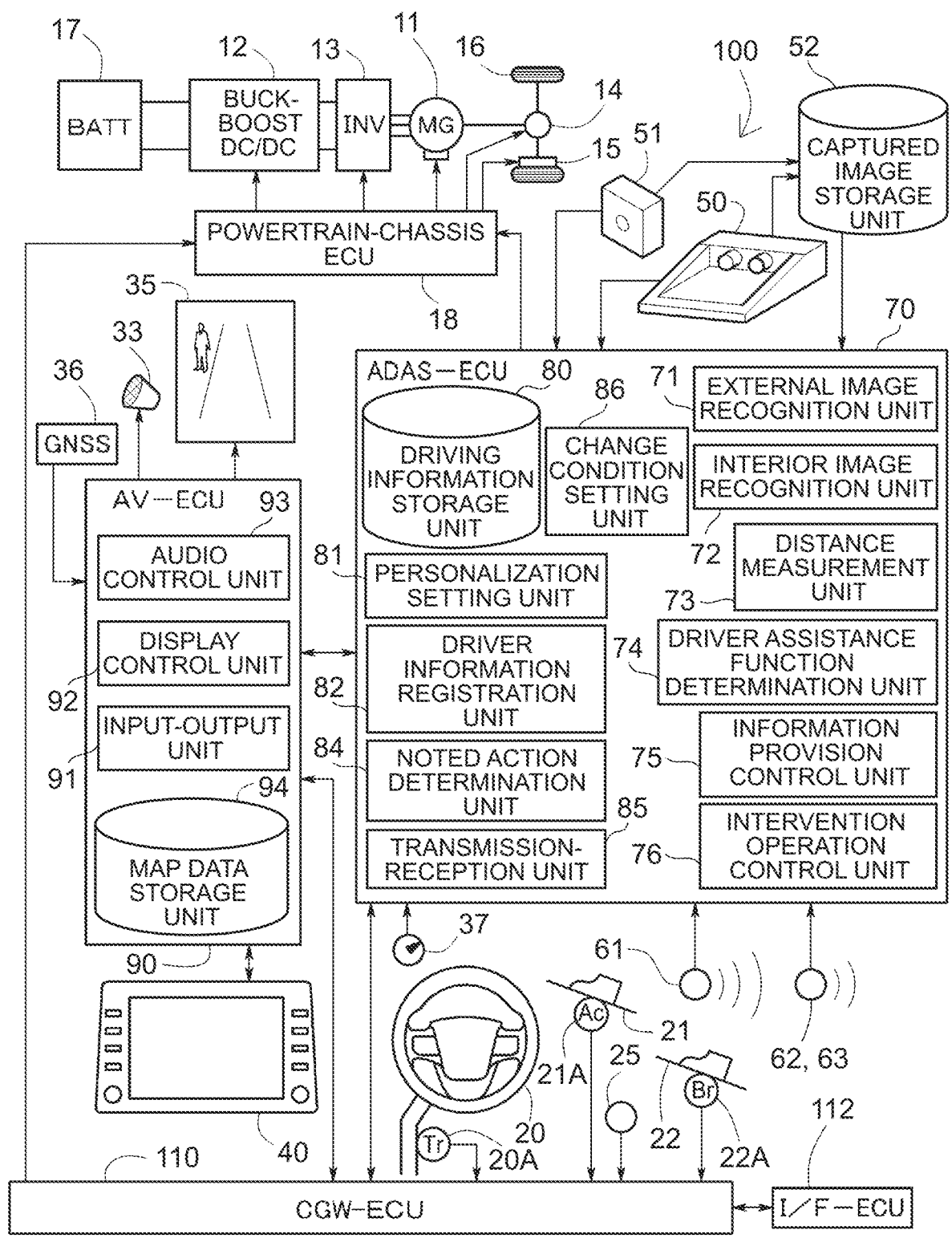
FIG. 6 is a diagram exemplifying functional blocks of the ADAS-ECU and the AV-ECU.

A microcomputer executes a program stored in the memory of the AV-ECU 90 to configure the functional blocks in the AV-ECU 90 as exemplified in FIG. 6. That is, the AV-ECU 90 includes an input-output unit 91, a display control unit 92, an audio control unit 93, and a map data storage unit 94.

The program may be stored in a non-transitory computer-readable storage medium such as a digital versatile disc (DVD), instead of storing the program in the memory, and the microcomputer may read and execute the program. Various functional blocks exemplified in FIG. 6 are configured in the AV-ECU 90 by such means as well.

The map data storage unit 94 stores map data associated with latitude and longitude information. The input-output unit 91 receives input signals from peripheral devices such as the ADAS-ECU 70. Further, the input-output unit 91 also receives input operation signals from the center display 40 that is a touch panel and transmits the signals to the peripheral devices such as the ADAS-ECU 70.

The audio control unit 93 controls the output of notification sounds included in the information provision type driver assistance function. For example, upon receipt of a notification command from an information provision control unit 75 of the ADAS-ECU 70, the audio control unit 93 causes the speakers 33 to output a notification sound.

The display control unit 92 controls display images of the meter display 35 and the center display 40. The display control unit 92 executes display control of notification messages included in the information provision type driver assistance function. For example, upon receipt of a notification command from the information provision control unit 75 of the ADAS-ECU 70, the display control unit 92 causes the meter display 35 to display a notification message text or a warning image (image of a pedestrian, etc.).

Furthermore, as will be described later, the display control unit 92 determines whether to display the approval screen (see FIGS. 13, 14) in accordance with the vehicle speed detected by the vehicle speed sensor 25 when the set value of the driver assistance function is changed to the recommended value.

Functional Block of ADAS-ECU

The microcomputer 70D (see FIG. 5) of the ADAS-ECU 70 executes a program stored in the memory 70E, thereby configuring the functional blocks in the ADAS-ECU 70 as exemplified in FIG. 6. That is, the ADAS-ECU 70 includes an exterior image recognition unit 71, an interior image recognition unit 72, a distance measurement unit 73, a driver assistance function determination unit 74, the information provision control unit 75, and an intervention operation control unit 76. The ADAS-ECU 70 further includes the driving information storage unit 80, a personalization setting unit 81, a driver information registration unit 82, the noted action determination unit 84, a transmission-reception unit 85, and a change condition setting unit 86.

Note that, the program may be stored in a non-transitory computer-readable storage medium such as DVD, instead of storing the program in the memory 70E, and the microcomputer 70D may read and execute the program. Various functional blocks exemplified in FIG. 6 are configured in the ADAS-ECU 70 by such means as well.

The exterior image recognition unit 71 recognizes an image area of an object outside the vehicle from the image captured by the exterior camera unit 50. For example, the exterior image recognition unit 71 is implemented with a convolutional neural network (CNN) capable of executing the single shot multibox detector (SSD) using supervised learning as an image recognition algorithm. Attributes of various objects (vehicles, pedestrians, road signs, structures, etc.) included in the images captured by the exterior camera unit 50 are recognized through such image recognition.

Further, the distance measurement unit 73 acquires captured image data that has been subjected to image recognition from the exterior image recognition unit 71. Further, the distance measurement unit 73 also acquires three-dimensional point cloud data of distance measurement information from the LiDAR sensor 61. The distance measurement unit 73 obtains what kind of attributes an object has and how far the object is from the host vehicle by combining the three-dimensional point cloud data and the captured image data.

The interior image recognition unit 72 recognizes the face of the driver from the image captured by the interior camera 51 using the image recognition algorithm described above. The personalization setting unit 81 determines whether the driver corresponds to one of the registered drivers stored in the driving information storage unit 80 based on a face recognition result. Further, the noted action determination unit 84 determines whether the driver is performing a noted action, such as looking aside, based on the face recognition result.

The driver assistance function determination unit 74 determines whether to execute the driver assistance function with respect to the information provision control unit 75 and the intervention operation control unit 76 based on object information (the attributes and the distance from the host vehicle) around the host vehicle from the distance measurement unit 73.

The driver assistance functions are classified into main categories of an information provision type and an intervention operation type. In the information provision type assistance, the operation to be performed by the driver is instructed through at least one of auditory and visual information. For example, a notification message is displayed on the center display 40 or the meter display 35, or a notification sound is output from the speakers 33.

In the intervention operation type assistance, the driver assistance system intervenes in the steering operation, the braking operation, and the accelerator operation by the driver. For example, the driver assistance system takes over the driving operation as the intervention operation command is transmitted to the steering actuator 14, the brake actuator 15, and the inverter 13.

For example, the information provision type driver assistance function is executed as a preliminary step before the intervention operation type driver assistance function is executed. For example, when a pedestrian in front comes close in a predetermined first threshold distance, the driver assistance function determination unit 74 transmits a pedestrian approaching notification to the information provision control unit 75. The information provision control unit 75 transmits a pedestrian approaching warning command to the display control unit 92 and the audio control unit 93 of the AV-ECU 90. The display control unit 92 causes the meter display 35 to display the pedestrian image. Also, the audio control unit 93 causes the speakers 33 to output the notification sound.

When the distance to the pedestrian further decreases and the vehicle 100 approaches the pedestrian in a predetermined second threshold distance, the driver assistance function determination unit 74 outputs the intervention operation command to the intervention operation control unit 76. In response to the above, the intervention operation control unit 76 operates the brake actuator 15 via the powertrain-chassis ECU 18 to decelerate the vehicle 100, and also operates the steering actuator 14 such that the vehicle 100 moves close to the side opposite to the pedestrian in the lane in which the vehicle 100 is traveling.

The number of operations of the driver assistance function above is counted up. For example, FIG. 9 exemplifies the driver assistance function recording table. As exemplified in this table, after the driver assistance functions are sorted into the information provision type and the intervention operation type, the number of operations of each driver assistance function is counted up. In the driver assistance function recording table, the number of operations of each driver assistance function is recorded for each registered driver registered in the driver information registration unit 82.

In addition, this table also records data on the date and time when and a location where the driver assistance function is executed. The driver assistance function determination unit 74 acquires date and time data from the clock 37 (see FIG. 6). Further, the driver assistance function determination unit 74 also acquires location data from the self-position estimator 36. Further, with reference to the map data storage unit 94, the driver assistance function determination unit 74 extracts the name of the facility, intersection, or the like that is closest to the latitude and longitude of the vehicle 100 when the driver assistance function is executed, and records the extracted data in the driver assistance function recording table.

The noted action determination unit 84 determines whether a predetermined noted action among the driver actions has occurred in the vehicle 100. FIG. 10 exemplifies the noted action table. The noted action table is stored for each registered driver based on a personalization function to be described later. Noted action items are set in the noted action table.

The noted action refers to a driver action that increases the risk of a vehicle accident, and includes, for example, sudden braking, sudden acceleration, sharp steering, and looking aside. The sudden braking and the sudden acceleration denote states in which depressing accelerations of the brake pedal and the accelerator pedal exceed predetermined threshold values. The sharp steering refers to a state in which the angular acceleration when the steering wheel is turned exceeds a predetermined threshold value.

The noted action determination unit 84 determines whether noted actions of the sudden braking, sudden acceleration, and sharp steering occur based on the operation amounts detected by the brake position sensor 22A (see FIG. 6), the accelerator position sensor 21A, and the torque sensor 20A, respectively. Whether the driver looks aside can be determined from the captured image of the interior camera 51 as described above.

It is possible to determine with high accuracy whether the noted action occurs by determining whether there is a noted action based on the actual operation amount detected by the brake position sensor 22A, the accelerator position sensor 21A, and the torque sensor 20A. For example, it is possible to determine with high accuracy whether the noted action occurs, as compared with determination based on images captured inside and outside the vehicle by the exterior camera unit 50, the interior camera 51, and the like.

For example, there may be case where, when the driver applies the sudden braking, that is, when the driver rapidly depresses the brake pedal 22, the driver assistance functions such as an anti-brake lock system (ABS) is activated, and thus a braking force corresponding to the depression amount of the brake pedal 22 cannot be obtained.

In other words, even when the driver depresses the brake pedal 22 rapidly, such braking may not result in sudden braking in terms of the vehicle behavior. As described above, there is a case where, when the driver assistance function intervenes on the operation line from the input as the operation amount to the output as the vehicle operation, the output and the input are out of balance. In other words, the vehicle 100 outputs the acceleration, turning attitude, and braking amount that do not correspond to the operation amounts of the accelerator pedal 21, the steering wheel 20, and the brake pedal 22, by executing the driver assistance function.

Therefore, in the driver assistance system according to the present embodiment, for example, whether the noted action occurs is determined based on the actual operation amount of the driver, instead of the vehicle behavior, with respect to the noted action (sharp steering, sudden acceleration, sudden braking) related to the operation of the driver.

For example, when the brake pedal 22 is immediately deeply depressed, the driver assistance function may be activated and the sudden brake may not be applied to the vehicle 100. Even in such a case, the noted action determination unit 84 counts up the noted action "sudden braking" based on the operation amount of the brake pedal 22 detected by the brake position sensor 22A. It is possible to grasp the driving habits of each registered driver by performing such a determination.

Also, captured images are used for some of the noted actions. For example, the noted action determination unit 84 determines whether the driver looks aside based on the facial image recognition of the driver by the interior image recognition unit 72.

The noted action table also records the number of occurrences of each noted action item and its activation history. The activation history includes the date and time when and the location where the noted action occurs. The noted action determination unit 84 acquires the date and time data from the clock 37 (see FIG. 6). Further, the noted action determination unit 84 also acquires the location data from the self-position estimator 36. For example, the names of the facility, intersection, etc. closest to the latitude and longitude of the vehicle 100 when the noted action occurs are recorded in the driver assistance function recording table.

Driver Registration

The driver information registration unit 82 can register the driver information of the vehicle 100. For example, new driver registration and setting changes can be performed from the center display 40 that is a touch panel.

For example, the driver information registration unit 82 stores the driver's name, account name, and password input by the registered driver in the driving information storage unit 80. Further, the driver information registration unit 82 stores the face image of the registered driver captured by the interior camera 51 in the driving information storage unit 80.

FIG. 7 exemplifies a driver profile screen. Images of a driver face image 210, a driver name 212, a driver basic information tab 214, a driver assistance function information tab 216, and a driving assessment tab 218 are displayed on this screen. For example, when the driver basic information tab 214 is selected, the name, age, etc. of the registrant can be registered. Also, the identification code of the mobile terminal owned by the registrant is registered. Further, as profile information, for example, the position and height of the driver's seat, the angle of the seat back, and the like are registered.

Personalization of Driver Assistance Function

The personalization setting unit 81 (see FIG. 6) can set whether the personalization function is enabled or disabled for each driver assistance function and for each registered driver. FIG. 7 exemplifies the screen of the center display 40 when the driver assistance function information tab 216 is selected. In the driver assistance function information tab 216, various setting items are selected for each of a plurality of the driver assistance functions. The driver assistance function as a setting target can be switched by operating a return button 202 and a forward button 203. For example, in FIG. 7, pre-crash safety is displayed as a driver assistance function.

Furthermore, setting items for pre-crash safety include function on-off, the presence or absence of the notification, a buzzer volume, a detection sensitivity, and on-off (enabled or disabled) of the personalization function. For example, among these setting items, the presence or absence of the notification and the buzzer volume are exemplified as the information provision type setting items. Further, the detection sensitivity is exemplified as the intervention operation type setting item because the timing at which the intervention operation command is transmitted from the ADAS-ECU 70 is changed.

In FIG. 7, initial values of the setting items are indicated by hatching. At the time of new registration, the driver can set the set values of the setting items to arbitrary values. In particular, at the time of new registration, the driver can select between the driver assistance function that the driver desires personalization and the driver assistance function that the driver does not desire personalization in a manner such that whether to use the personalization function can be set for each driver assistance function. The set values set in the driver assistance function information tab 216 are stored in the driving information storage unit 80 by the personalization setting unit 81.

When settings for various driver assistance functions are completed, the setting information is stored in the driving information storage unit 80 in a format such as a driver assistance information setting table illustrated in FIG. 8. Among the setting items, manual set values and current set values may be recorded for setting items other than function on-off and personalization function on-off.

The manual set values refer to set values selected by the driver on the driver assistance function setting screen (FIG. 7). In other words, the manual set values represent the set values based on driver preferences. When the set value is not selected by the driver, the initial value becomes the manual set value. A value different from the manual set value can become the current set value by enabling the personalization function. As will be described later, the manual set values are referenced when the recommended values obtained by the personalization function are sorted into the approval type and the automatic change type.

OTA Center Server

With reference to FIG. 1, the OTA center server 150 can transmit update programs for software and firmware installed in various ECUs of the vehicle 100 by wireless communication (over-the-air).

The OTA center server 150 wirelessly communicates with the vehicle 100, communicates with the I/F-ECU 112 (see FIG. 6) of the vehicle 100, and transmits and receives signals to and from various ECUs of the vehicle 100. For example, the OTA center server 150 is installed at a development center for the vehicle 100 or the like.

The OTA center server 150 is composed of a computer, for example, and includes a hardware configuration as exemplified in FIG. 5. The microcomputer of the OTA center server 150 executes the program stored in the memory, whereby the functional blocks exemplified in FIG. 1 are configured in the OTA center server 150. That is, the OTA center server 150 includes a driving assessment unit 151, a recommended value calculation unit 152, and a driving history storage unit 153.

The program may be stored in a non-transitory computer-readable storage medium such as a digital versatile disc (DVD), instead of storing the program in the memory, and the microcomputer may read and execute the program. Various functional blocks exemplified in FIG. 1 are configured in the OTA center server 150 by such means as well.

The driving history data of the vehicle 100 is transmitted to the driving assessment unit 151 via the I/F-ECU 112 (see FIG. 6). The driving history data is data stored in the driving information storage unit 80 of the ADAS-ECU 70, and is organized for each registered driver as described above. As described above, the driving history data can also be called driving-related information, and the information includes information recorded in the driver assistance function recording table (see FIG. 9) and the noted action table (see FIG.

The driving assessment unit 151 performs driving assessment based on the received driving history data and past driving history data stored in the driving history storage unit 153. For example, in the driving assessment, driving ability is evaluated for each classification such as handling, acceleration, or deceleration. For example, the driving ability is evaluated by score based on the number of noted actions and the number of times the driver assistance function is executed. For example, the driving assessment unit 151 obtains deduction points for the item of handling based on the number of times of sharp steering and the number of times that lane tracing assist is activated.

The recommended value calculation unit 152 calculates a recommended value of the driver assistance function for each registered driver based on the driver related information including the driving history. For example, the recommended value calculation unit 152 calculates the recommended function based on a result of the driving assessment. For example, as the evaluation score of the braking operation becomes lower, in other words, as the number of noted actions related to the braking operation and the number of times that the driver assistance function related to braking operation is activated increase, the detection sensitivity of the driver assistance function related to the braking operation (for example, pre-crash safety) has a higher value as the recommended value. The calculated recommended value is transmitted to the personalization setting unit 81 of the ADAS-ECU 70 via the I/F-ECU 112 of the vehicle 100.

The personalization setting unit 81 personalizes various driver assistance functions based on the recommended values of the driver assistance functions transmitted from the OTA center server 150. As described above, personalization is a proposal for setting changes from the driver assistance system side, and is different from customization in which the driver sets preferences.

The personalization is classified into the approval type and the automatic change type. In the approval type, the approval of the driver is required when the current set value is changed to the recommended value. In the automatic change type, the current set value is automatically changed to the recommended value without the approval of the driver.

Approval Necessity Determination Flow

FIG. 11 exemplifies an approval necessity determination flow. In this flow, whether the recommended value transmitted from the OTA center server 150 to the vehicle 100 is to be sorted into the approval type or the automatic change type is determined for each setting item. This flow is executed by the change condition setting unit 86. Also, this flow is started when the recommended value is received from the OTA center server 150.

The change condition setting unit 86 extracts registered driver information corresponding to the initial value (m=1) of a driver counter m for the registered drivers stored in the driving information storage unit 80 (S10). Next, the change condition setting unit 86 extracts the driver assistance function to be personalized (personalized driver assistance function) (S12) with reference to the driver assistance function setting table (FIG. 8) related to the registered driver of the counter m.

Further, the change condition setting unit 86 extracts driver assistance function information corresponding to the initial value (n=1) of a driver assistance function counter n (S14). Then, the change condition setting unit 86 extracts the setting item of which the recommended value is different from the current set value among various setting items of the driver assistance function of the counter n=1 (S16). For example, when the current set value of the buzzer volume is "medium" and the recommended value is "small", the setting item "buzzer volume" is extracted.

Next, the change condition setting unit 86 extracts the setting item information for a counter k=1 (S18). Then, the change condition setting unit 86 determines whether automatic change of the setting item of the counter k is disallowed legally (S20). For example, in the driving information storage unit 80, identification information on whether automatic change is not allowed in light of laws and regulations is registered for each setting item. The change condition setting unit 86 refers to the registration information and makes a determination in step S20.

For example, with respect to the pre-crash safety setting item "notification", when a consent of the driver is legally required for switching the buzzer setting from on to off, the change condition setting unit 86 sorts the recommended value of the setting item into the approval type (S32).

In step S20, when automatic change of the setting item of the counter k is allowed legally, the change condition setting unit 86 determines whether the similar change has been made during the previous trip (S22).

The trip denotes to a period from when a vehicle control system of the vehicle 100 is turned on until the vehicle control system is turned off. The driving information storage unit 80 stores past driving histories for each registered driver. The driving information storage unit 80 also stores the change history of set values in past trips.

For example, when the set value is automatically changed by the personalization function, the set value is changed only for one trip, and is returned to the manual set value at the start of the next trip. The change condition setting unit 86 determines whether the current recommended value has also been proposed during the previous trip with reference to the change history of the set value (S22). When the current recommended value has also been proposed during the previous trip, the change condition setting unit 86 sorts this recommended value into the approval type (S32).

When the current recommended value has not been proposed at the time of the previous trip, the change condition setting unit 86 determines whether an assistance intensity of the driver assistance function of the counter n is lowered by changing the setting from the current set value to the recommended value (S24).

The lowered assistance intensity means that, in other words, a range of assistance by the driver assistance function is narrowed. For example, when the current set value of the setting item "detection sensitivity" of the pre-crash safety is "high" and the recommended value is "medium", the assistance intensity is lowered. Further, when the current set value of the setting item "inter-vehicle distance" of the adaptive cruise control is "medium" and the recommended value is "short", the assistance intensity is lowered.

The change condition setting unit 86 sorts the recommended value into the automatic change type when the recommended value raises the assistance intensity more than the currently set value (S30). On the other hand, when the recommended value lowers the assistance intensity from the current set value, the change condition setting unit 86 determines whether the assistance intensity of the driver assistance function of the counter n is lowered by changing the setting from the manual set value to the recommended value (S26).

The manual set value can be said to be a set value that the driver prefers. When the assistance intensity is lower compared to the drive assistance based on the set value that the driver prefers, the driver may feel uncomfortable. When the assistance intensity is lowered based on the recommended value than that of the manual set value, the change condition setting unit 86 sorts the recommended value into the approval type (S32).

On the other hand, when the assistance intensity is raised based on the recommended value than that of the manual set value, the change condition setting unit 86 determines whether the setting item to which the recommended value is set is the intervention operation type (S28). For example, with reference to FIG. 8, the setting item "detection sensitivity" of the pre-crash safety is the intervention operation type because the start timing of an intervention braking operation based on the function differs depending on the set value. On the other hand, the setting item "buzzer volume" is the information provision type because this function does not pass through the powertrain-chassis ECU 18 (see FIG. 6). For example, classification information as to whether each setting item is the intervention operation type or the information provision type is stored in the driving information storage unit 80 in accordance with the characteristics of each setting item.

When the setting item of the counter k is not the intervention operation type (when the setting item of the counter k is the information provision type), the change condition setting unit 86 sorts the recommended value related to that setting item into the automatic change type (S30). On the other hand, when the setting item of the counter k is the intervention operation type, the change condition setting unit 86 sorts the recommended value related to that setting item into the approval type (S32).

Furthermore, the change condition setting unit 86 determines whether the setting item counter k is the final value k_end (S34). When the setting item counter k does not reach the final value k_end, the change condition setting unit 86 increments the counter k (S40) and returns to step S20.

When the setting item counter k has reached the final value k_end, the change condition setting unit 86 determines whether the personalized driver assistance function counter n has reached a final value n_end (S36). When the counter n does not reach the final value n_end, the change condition setting unit 86 increments the counter n (S42) and returns to step S16.

When the personalized driver assistance function counter n has reached the final value n_end, the change condition setting unit 86 determines whether the registered driver counter m has reached the final value m_end (S38). When the registered driver counter m does not reach the final value m_end, the change condition setting unit 86 increments the counter m (S44) and returns to step S12. When the registered driver counter m has reached the final value m_end, the flow in FIG. 11 is completed.

When the flow in FIG. 11 is completed, the change condition setting unit 86 extracts the recommended value corresponding to the registered driver who is driving from among the recommended values sorted into the automatic change type, for example, and changes the set value from the current set value to the recommended value. The content of this change is reported to the driver as a sound message from the speakers 33, for example. Further, the registered driver can operate the center display 40 to display the content as a text message.

Further, after the flow in FIG. 11 is completed, the approval by the driver is required for the recommended value of the approval type. The personalization setting unit 81 extracts, for example, the recommended value corresponding to the registered driver who is driving from among approval type recommended values.

Display Necessity Determination

FIG. 12 illustrates a display necessity determination flow. In the flow, the display necessity of the approval screen is determined when the set value of the driver assistance function is changed to the approval type recommended value. The approval screen includes an approval screen shown in FIG. 13 and a detailed explanation screen shown in FIG. 14. As described below, the display control unit 92 suspends display of the approval screen while the vehicle 100 is traveling.

The display necessity determination flow is repeatedly executed, for example, when the control system of the vehicle 100 is in the on state, as indicated by "RETURN" at the end. The display control unit 92 checks whether there is a recommended value for which a change has not been approved among various set values of the driver assistance function for the registered driver who is driving (S50). When there is no unapproved recommended value, the flow in FIG. 12 continues to the end and returns to the beginning.

When there is an unapproved recommended value, the display control unit 92 acquires a speed V of the vehicle 100 from the vehicle speed sensor 25. Then, the display control unit 92 determines whether the speed V is included between a first speed threshold value −Vth1 and a second speed threshold value +Vth2 (S52). For example, the first speed threshold value −Vth1 is −5 km/h and the second speed threshold +Vth2 is 5 km/h.

When the speed V is equal to or less than the first speed threshold −Vth1 or equal to or more than the second speed threshold +Vth2, the display control unit 92 suspends the display of the approval screen (FIG. 13) (S60). This avoids displaying the approval screen while driving.

On the other hand, when the speed V exceeds the first speed threshold −Vth1 and is less than the second speed threshold +Vth2, the display control unit 92 causes the center display 40 that is the display unit to display the approval screen (FIG. 13) (S54).

In this approval screen, images of an OK button 240 and a detail button 242 are displayed in addition to a text indicating that the set value is to be changed to the recommended value.

The OK button 240 is a button for permitting modification of the approval type recommended values all at once. Note that the change to the recommended value by turning on the OK button 240 is limited to the current trip, and the various set values are returned to the manual set values on the next trip.

The detail button 242 is a button image for displaying the details of the contents of the change. When this button image is turned on, the display control unit 92 causes the center display 40 to display the detailed explanation screen exemplified in FIG. 14.

On the detailed explanation screen, the driver assistance function to be changed and its setting items are shown in the form of a radar chart. In this radar chart, an axis is provided for each setting item, and set values are allocated on the axis. Furthermore, the values currently being set are shown in the radar chart, and the changed portions by, for example, a recommended value 248 is highlighted. For example, the recommended value 248 is highlighted.

In addition, the display control unit 92 causes the center display 40 to display a text 247 indicating the reason for changing the set value to the approval type recommended value on the detailed explanation screen. The text 247 as described above can be acquired from the recommended value calculation unit 152 of the OTA center server 150 (see FIG. 1).

Images of a limited approval button 244, a comprehensive approval button 245, and a disapproval button 246 are displayed on the detailed explanation screen. The limited approval button 244 is a button for approving changes limited to the current trip. The comprehensive approval button 245 is a button for approving changes over subsequent trips. The manual set values are also changed to the recommended values in addition to the current set values by turning the comprehensive approval button 245 on.

When the recommended values are collectively approved on the approval screen (FIG. 13), or when all of the recommended values are individually approved on the detailed explanation screen (FIG. 14) (S56), the display control unit 92 hides the approval screen (FIGS. 13, 14) (S60).

Further, even when the recommended value has not been approved, the display of the approval screen is suspended when the vehicle 100 starts traveling again. When the speed V acquired from the vehicle speed sensor 25 is equal to or less than the first speed threshold value −Vth1 or is equal to or more than the second speed threshold value +Vth2 (S58), the display control unit 92 switches the approval screen (FIG. 13, 14) to be hidden (S60). On the other hand, when the speed V exceeds the first speed threshold −Vth1 and is less than the second speed threshold +Vth2, the display control unit 92 continues to display the approval screen (FIGS. 13, 14).

As described above, in the present embodiment, the setting items of the automatic change type are changed without the approval of the driver, whereby it is possible to save time and effort for the approval operation. Further, for the setting items of the approval type, it is possible to request an approval on the setting change at an appropriate timing while an environment in which the driver can concentrate on driving can be ensured.

What is claimed is:

1. A driver assistance system for a vehicle, wherein:
a plurality of driver assistance functions is executable with respect to the vehicle, a plurality of setting items is set for each of the driver assistance functions, and a set value is set for each of the setting items; and
the driver assistance system includes at least one computer comprising:
a driver information registration unit that registers driver information of a driver;
a personalization setting unit that sets enable and disable of a personalization function that allows the set value to be changed to a recommended value for each of the driver assistance functions and for each driver registered in the driver information registration unit,
a recommended value calculation unit that obtains the recommended value based on driving-related information of the driver including a driving history,
a change condition setting unit that sorts a plurality of the recommended values into an approval type recommended value that requires an approval of the driver and an automatic change type recommended value that does not require the approval of the driver, and
a display controller that is able to display an approval screen for the approval type recommended value on a display, and suspends display of the approval screen based a detected vehicle speed, wherein
the change condition setting unit
sorts the recommended value into the approval type recommended value when the setting item to which the recommended value is set is an intervention operation type, and
sorts the recommended value into the automatic change type recommended value when the setting item to which the recommended value is set is an information provision type, wherein
the display controller
causes the display to display, on the approval screen, a button image for displaying a detailed change content, and
causes the display to display a plurality of approval button images, wherein a first approval button image of the plurality of approval button images is for permanently implementing the recommended value over subsequent trips, and a second approval button image of the plurality of approval button images is for temporarily implementing the recommended value to a current trip.

2. The driver assistance system according to claim 1, wherein the display controller highlights a portion changed by the approval type recommended value on a detailed explanation screen that displays the detailed change content.

3. The driver assistance system according to claim 2, wherein the display controller causes the display to display the set value of the setting item in a form of a radar chart for each of the driver assistance functions on the detailed explanation screen.

4. The driver assistance system according to claim 3, wherein the display controller causes the display to display a text indicating a reason for changing the set value to the approval type recommended value on the detailed explanation screen.

5. The driver assistance system according to claim 3, wherein the display controller causes the display to display the recommended value on the radar chart.

6. The driver assistance system according to claim 1, wherein the display controller causes the display to display a disapproval button for refusing implementation of the recommended value.

7. The driver assistance system according to claim 1, wherein the display controller causes the display to hide the approval screen in response to the detected vehicle speed between greater than zero and less than or equal to a first threshold speed.

8. The driver assistance system according to claim 7, wherein the display controller causes the display to display the approval screen in response to the detected vehicle speed exceeding the first threshold speed and being less than or equal to a second threshold speed, and the second threshold speed is greater than the first threshold speed.

9. The driver assistance system according to claim 8, wherein the display controller causes the display to hide the approval screen in response to the detected vehicle speed exceeding the second threshold speed.

* * * * *